(12) United States Patent
Guering et al.

(10) Patent No.: US 7,784,736 B2
(45) Date of Patent: Aug. 31, 2010

(54) FRONT AIRCRAFT PART COMPRISING A FLAT PARTITION BETWEEN A PRESSURISED ZONE AND A NON-PRESSURISED ZONE HOUSING LANDING GEAR

(75) Inventors: Bernard Guering, Montrabe (FR); Jonathan Guering, Toulouse (FR)

(73) Assignee: Airbus France, Toulouse (FR)

( * ) Notice: Subject to any disclaimer, the term of this patent is extended or adjusted under 35 U.S.C. 154(b) by 173 days.

(21) Appl. No.: 11/964,537

(22) Filed: Dec. 26, 2007

(65) Prior Publication Data

US 2008/0210813 A1    Sep. 4, 2008

(30) Foreign Application Priority Data

Jan. 3, 2007    (FR)    ................................. 07 52516

(51) Int. Cl.
    *B64C 1/00*    (2006.01)
(52) U.S. Cl. .................. 244/119; 244/102 R
(58) Field of Classification Search ............. 244/159.3, 244/119, 100 R, 102 R, 102 A, 129.4, 129.1, 244/120
    See application file for complete search history.

(56) References Cited

U.S. PATENT DOCUMENTS 2,642,238 A * 6/1953 McCarty, Jr. et al. ........ 244/101

| 2,872,137 | A | * | 2/1959 | Gluhareff ................. 244/120 |
| 3,150,849 | A | * | 9/1964 | Conway et al. ......... 244/100 R |
| 3,335,981 | A | * | 8/1967 | Pauli et al. ............. 244/102 R |
| 3,653,615 | A | * | 4/1972 | Spence ................... 244/137.1 |
| 5,482,228 | A | * | 1/1996 | Hoshino ..................... 244/50 |
| 6,129,308 | A | * | 10/2000 | Nastasi et al. ............... 244/36 |
| 6,213,428 | B1 | * | 4/2001 | Chaumel et al. .......... 244/119 |
| 7,143,975 | B2 | * | 12/2006 | Udall ..................... 244/102 R |

FOREIGN PATENT DOCUMENTS

EP    0 980 822 A1    2/2000

OTHER PUBLICATIONS

U.S. Appl. No. 12/336,988, filed Dec. 17, 2008, Guering, et al.
U.S. Appl. No. 12/373,055, filed Jan. 9, 2009, Guering.

* cited by examiner

*Primary Examiner*—Michael R Mansen
*Assistant Examiner*—Brian M O'Hara
(74) *Attorney, Agent, or Firm*—Oblon, Spivak, McClelland, Maier & Neustadt, L.L.P.

(57) ABSTRACT

The present invention relates to a front aircraft part (1) comprising a non-pressurised landing gear housing zone (28) designed to house a front landing gear (30) in a retracted state, as well as a pressurised zone (2) adjacent to the non-pressurised landing gear housing zone. According to the invention, the pressurised zone is delimited by a set of walls among which only a substantially flat-shaped sealed partition wall (10) also participates in delimiting the non-pressurised landing gear housing zone (28).

15 Claims, 4 Drawing Sheets

FRONT AIRCRAFT PART COMPRISING A FLAT PARTITION BETWEEN A PRESSURISED ZONE AND A NON-PRESSURISED ZONE HOUSING LANDING GEAR

TECHNICAL FIELD

The present invention relates in general terms to a front aircraft part, also referred to as the nose, of the type comprising a non-pressurised zone for housing the landing gear, designed to house the front landing gear in a retracted state, as well as a pressurised zone adjacent to this non-pressurised zone for housing the landing gear.

The invention is particularly adapted to large capacity and very large capacity commercial aircraft.

PRIOR ART

In the prior art, a conventional front aircraft part is known in which the non-pressurised zone for housing the front landing gear, also referred to as the "landing gear compartment", takes the form of a substantially parallelepipedal space considerably offset towards the rear with respect to a radome area.

The non-pressurised zone housing the front landing gear is therefore located in a lower part of the pressurised zone and separated from this by a plurality of sealed partitions, among which there are two vertical lateral partitions, a front partition, a rear partition and a ceiling, often slightly inclined downwards towards the rear. In addition, vertical reinforcements are normally provided for cooperating with the lateral partitions, in order to ensure a secure and rigid location of the non-pressurised zone housing the front landing gear in the lower part of the pressurised zone. In addition, these structural reinforcements, which are situated within the pressurised zone, serve above all for taking up the pressurisation. By way of indication, the part of the pressurised zone in which the landing gear compartment is situated is normally used for the purpose of storing technical equipment particular to the aircraft, or for a goods load, also referred to as the cargo load.

In the light of the above, it is clear that one of the drawbacks of the conventional solution of the prior art discussed above lies in the complexity of the geometry of the front landing gear compartment, which unavoidably results in a lengthy and tedious installation, detrimental in terms of installation costs. This installation is all the more constraining since the spaces formed between the walls that delimit the front landing gear compartment and the fuselage of the aircraft are generally very small, and therefore not very propitious to fitting the aforementioned vertical structural reinforcements.

Moreover, the space available within the pressurised zone is greatly reduced by the presence of the substantially parallelepipedal-shaped landing gear compartment, which makes it unsuitable, in particular with a view to the storage of technical equipment particular to the aircraft and/or a goods load.

OBJECT OF THE INVENTION

The aim of the invention is therefore to propose a front aircraft part remedying the drawbacks mentioned above, relating to the embodiments of the prior art.

To do this, the object of the invention is a front aircraft part comprising a non-pressurised zone housing landing gear designed to house front landing gear in a retracted state thereof, as well as a pressurised zone adjacent to said non-pressurised zone housing the landing gear. According to the invention, said pressurised zone is delimited by a set of walls among which only a sealed substantially flat-shaped partition wall also participates in delimiting said non-pressurised landing gear housing zone, said substantially flat-shaped sealed partition wall also delimiting, at the top part thereof, a non-pressurised radome zone separated from said non-pressurised landing gear housing zone by means of an intermediate partition, the front end of which is fixedly attached to an aerodynamic fuselage cladding, and the rear end of which is fixedly attached to said substantially flat-shaped sealed partition wall.

In other words, if it is considered firstly that the pressurised zone is delimited by a first set of walls among which there are also fuselage portions, and secondly that the non-pressurised landing gear housing zone is delimited by a second set of walls among which there is also a lower fuselage portion, then one of the particularities of the present invention lies in the fact that the only common element between these first and second sets is a substantially flat-shaped sealed partition wall, or preferably only a part thereof. By way of indication, it is a case preferably of an element normally referred to as the "front sealed end" of the pressurised zone, constituting a forward limit of the latter, generally attached to a front end of a separation floor of the pressurised zone.

The solution proposed by the present invention therefore contrasts strongly with the solutions of the prior art in which several walls arranged inside the pressurised zone were required for the delimitation of the non-pressurised front landing gear housing zone, also referred to as the "landing gear compartment", whereas here only a single substantially flat wall constitutes the separation interface between the two zones.

This configuration naturally gives rise to a substantial simplification of the manufacture of the front landing gear compartment, beneficial in terms of installation costs. Moreover, another advantage relating to the present invention lies in the possibility of easily producing this separation interface from composite material, for example of the type consisting of a mixture of resin and carbon and/or glass fibres, given that it is substantially flat and therefore perfectly adapted for being manufactured easily from such a material.

In addition, the geometry of the non-pressurised landing gear housing zone according to the invention advantageously no longer requires the presence of vertical structural reinforcements as was the case in the prior art, which also helps to make the operation of installing this non-pressurised landing gear housing zone perfectly optimised.

Moreover, the space available within the pressurised zone is also greatly optimised since it no longer serves to house a very bulky substantially parallelepipedal-shaped landing gear compartment. The space dedicated to the storage of technical equipment particular to the aircraft and/or a goods load can consequently advantageously be increased.

In the embodiment proposed by the present invention, it is noted, as already mentioned above, that the said substantially flat-shaped sealed partition participating in the delimitation of the non-pressurised landing gear housing zone also constitutes a sealed front end of the pressurised zone, namely a forward limit of the latter zone, generally fixedly attached to a front end of a separation floor between an upper pressurised compartment generally dedicated to the transportation of passengers and an under-floor pressurised compartment normally dedicated to the storage of technical equipment particular to the aircraft and/or to the storage of the goods load. Thus, apart from constituting a front limit of the pressurised zone, this substantially flat-shaped sealed partition can advantageously simultaneously constitute an anti-bird impact structure protecting the whole of the pressurised zone or only part thereof.

In addition, the substantially flat-shaped sealed partition wall also delimits, at the top part thereof, a non-pressurised radome zone, which constitutes the other portion of said front lower end part of the aircraft. This non-pressurised radome zone is separated from the non-pressurised landing gear housing zone by means of an intermediate partition, the front end of which is fixedly attached to an aerodynamic fuselage cladding and the rear end of which is fixedly attached to this substantially flat-shaped sealed partition wall. More particularly, provision is made for the rear end of the intermediate partition to be fixedly attached to the substantially flat-shaped sealed partition wall so as to be situated in line with the separation floor. Nevertheless, the rear end of the intermediate partition would have been able to be fixedly attached to the substantially flat-shaped sealed partition wall so as to be situated above or below the separation floor, without departing from the scope of the invention and according to the constraints and requirements encountered.

Preferably, the substantially flat-shaped sealed partition wall has a bottom end fixedly attached to an aerodynamic lower fuselage cladding, this sealed partition wall being arranged so as to extend forwards through the front part of the aircraft, from its bottom end. This enables it to partially constitute a front bottom end part of the aircraft.

Preferably, the substantially flat-shaped sealed partition wall is fixedly attached to a front end of a separation floor between a top pressurised compartment and an under-floor pressurised compartment both belonging to the pressurised zone.

In this case, provision can be made for the non-pressurised landing gear housing zone to be delimited by the entire portion of the substantially flat-shaped sealed partition wall that is situated under the separation floor, the top part of the periphery of which is preferentially fixedly attached to a front end of the separation floor, the remaining part of the periphery of this portion then preferably being entirely fixedly attached to an aerodynamic fuselage cladding, and more particularly to the aerodynamic lower-fuselage cladding.

Consequently, in any transversal section of the front part of the aircraft passing through the front landing gear compartment, the part of the section that is situated under said substantially flat-shaped sealed partition is entirely formed by the non-pressurised front landing gear compartment.

Preferentially, the substantially flat-shaped sealed partition wall is fixedly attached over its entire periphery to an aerodynamic fuselage cladding, which greatly facilities its installation, and at the same time ensures secure and rigid fixing not in any way requiring the addition of additional structural reinforcements. Moreover, in such a configuration making it possible to obtain simple geometries for the various areas of the front aircraft part, the substantially flat-shaped sealed partition wall can then constitute an anti-bird impact structure protecting the whole of the pressurised zone, namely both the top pressurised compartment and the under-floor pressurised compartment.

As mentioned previously, the substantially flat-shaped sealed partition wall is preferably produced from composite material, for example of the type consisting of a mixture of resin and carbon and/or glass fibres.

Preferably, the front aircraft part comprises a front landing gear provided with a deployable extension carrying a set of tyres at one of its ends and being articulated at the other end on an articulation situated to the rear with respect to the set of tyres when the front landing gear is housed in its retracted state inside the non-pressurised landing gear housing zone.

In this regard, the deployable extension is preferentially formed by a telescopic mechanism including at least three arms fitted in, this extension preferably being designed to ensure on the one hand the deployment/retraction of the landing gear and on the other hand the function of secure locking of this same landing gear in the deployed position. As known to persons skilled in the art, these two functions are also respectively referred to as the lifting jack function and the retracted landing gear holding counterbrace function.

Other advantages and characteristics of the invention will emerge from the following non-limitative detailed description.

BRIEF DESCRIPTION OF THE DRAWINGS

This description will be given with regard to the accompanying drawings, among which.

DETAILED DESCRIPTION OF PREFERRED EMBODIMENTS

Figure 1:
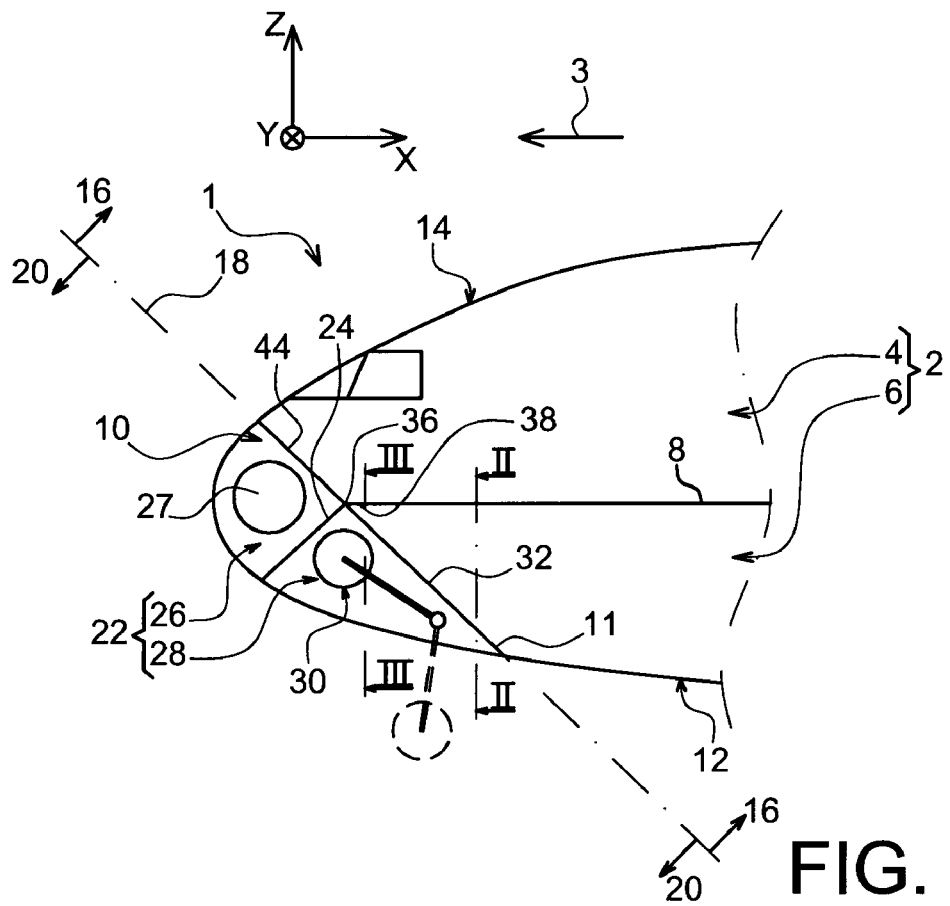
FIG. 1 depicts a schematic side view of a front aircraft part, according to a preferred embodiment of the present invention.
Figure 2:
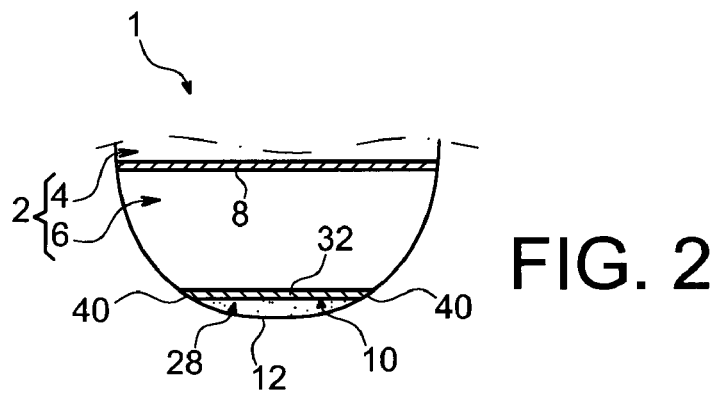
FIGS. 2 and 3 depict views in section taken respectively along the lines II-II and III-III in FIG. 1.
Figure 3:
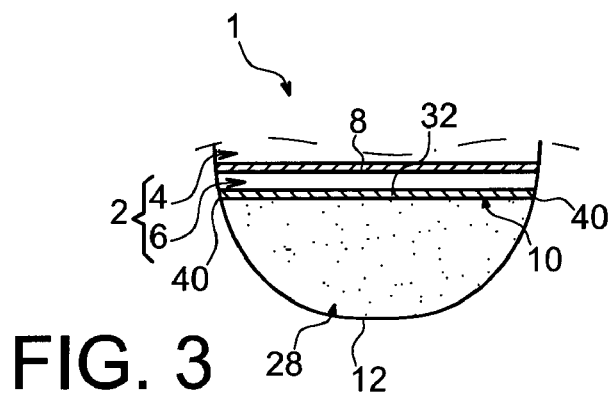

With reference first of all to FIGS. 1 to 3, a front aircraft part 1 or nose can be seen, according to a preferred embodiment of the present invention.

Throughout the following description, by convention, the longitudinal direction of the aircraft is referred to as X, the direction oriented transversely with respect to this is Y, and the vertical direction or height is Z, these three directions X, Y and Z being orthogonal to one another.

In addition, the terms "front" and "rear" are to be considered with respect to a direction of travel of the aircraft encountered following the thrust exerted by the turbojets, this direction being represented schematically by the arrow 3.

The front part 1 comprises first of all, in its rearmost part, a pressurised zone 2 within which there is situated a separation floor 8 between a top pressurised compartment 4 generally dedicated to the transportation of passengers and an under-floor pressurised compartment 6 normally dedicated to the storage of technical equipment particular to the aircraft and/or to the storage of the goods load. More precisely, the top pressurised compartment 4 generally comprises, from front to rear, the aircraft cockpit followed by the passenger cabin. In addition, the under-floor pressurised compartment 6 generally comprises, from front to rear, a so-called technical hold zone dedicated to the storage of technical equipment particular to the aircraft, followed by a so-called cargo hold zone dedicated to the storage of the goods load.

As is best visible in FIG. 1, the pressurised zone 2 is delimited towards the front by a substantially flat-shaped sealed partition, referenced 10, preferably produced from composite material, for example of the type consisting of a mixture of resin and carbon and/or glass fibres. This sealed partition wall 10 has a bottom end 11 fixedly attached to aerodynamic bottom fuselage cladding 12, this wall 10 being arranged so as to extend towards the front through the front aircraft part 1 from its bottom end 11. Thus the sealed wall 10, also fulfilling the function of a sealed front end of the pressurised zone 2, is substantially parallel to the direction Y and inclined in projection in a plane XZ, for example by an angle of between 20° and 50° with respect to the direction X.

In general terms, the pressurised zone 2 is delimited towards the front by this substantially flat sealed partition wall 10, but also delimited in the other directions by other walls belonging to a first set of walls among which there are in particular a top fuselage part 14, a bottom fuselage part 12, a rear sealed end (not shown), etc.

In FIG. 1, the arrows 16 represent schematically the direction of the pressurised zone 2 demarcated by the notional straight line 18, the arrows 20 for their part representing schematically the direction of a front zone referred to as the front bottom end part 22 of the aircraft, which supplements the pressurised zone 2 in order to constitute the front part 1.

The front bottom end part 22 is composed of two distinct zones, substantially situated one above the other and separated by an intermediate partition 24, namely a radome zone 26 serving for housing a radar set 27, and a non-pressurised front landing gear housing zone 28 designed to house a front landing gear 30 in a retracted state thereof, as shown schematically in FIG. 1.

The non-pressurised front landing gear housing zone 28, also referred to as the front landing gear compartment, is delimited by a second set of walls including in particular a bottom fuselage part 12, the intermediate wall 24, or a bottom portion 32 of the flat sealed partition wall 10.

One of the particularities of the present invention lies in the fact that the only common element between these first and second sets of walls is the bottom portion 32 of the substantially flat-shaped sealed partition wall 10, which provides simplified geometries for the pressurised under-floor compartment 6 and for the front landing gear compartment 28, the separation interface of which is therefore formed by this bottom portion 32 of the sealed partition wall 10.

The aforementioned bottom portion 32 can be defined as the entire portion of the wall 10 situated under the separation floor 8 to which it is fixedly attached, by means of conventional assembly means. This is because the sealed partition wall 10 is fixedly attached to a front end of the separation floor 8, as shown clearly in FIG. 1. More precisely, the bottom portion 32 of the sealed partition wall 10 that is situated under the separation floor 8 has a periphery, the top part 36 of which is effectively attached fixedly to the front end 38 of the separation floor 8, and the remaining bottom part 40 of which is entirely fixedly attached to the aerodynamic bottom fuselage cladding 12.

Thus, in any transverse sections of the front part 1 passing through the front landing gear compartment 28, as shown in FIGS. 2 and 3, the part of the section that is situated under the sealed partition wall 10 is entirely formed by the non-pressurised front landing gear compartment 28 represented by the grey-shaded parts, it being in particular noted that the size of the cross section of this compartment 28 increases going towards the front as far as the front end 38 of the floor 8.

In addition, if the bottom portion 32 of the sealed partition wall 10 separates the pressurised under-floor compartment 6 of the front landing gear compartment 28, its top portion 44 extending forwards and upwards from the front end 38 of the floor 8 for its part separates the top pressurised compartment 4 from the radome zone 26. More particularly, this portion 44 separates the cockpit from the radome zone 26, the bottom delimitation of which is achieved by means of the intermediate partition 24 having a front end fixedly attached to the aerodynamic bottom fuselage cladding 12, and a rear end fixedly attached to the sealed partition wall 10, preferably so as to be situated in line with the front end 38 of the separation floor 8, although being physically separated from the latter end 38 by the wall 10. As can be seen in FIG. 1, the intermediate partition 24 preferably extends downwards going towards the front, unlike the floor 8, which is for its part substantially parallel to a plane XY.

With reference now to FIGS. 4 to 8, the front aircraft part 1 can be seen in various states, clearly revealing the simplified geometry of the zones that make it up.

Figure 4:
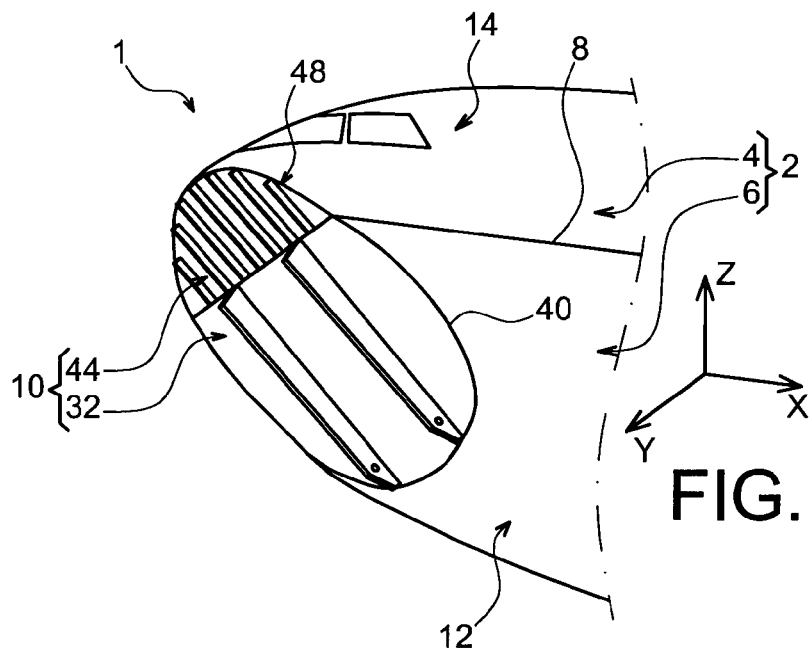
FIG. 4 depicts a partial perspective view of the front aircraft part shown in FIGS. 1 to 3, on which the front bottom end part ahs been omitted in order to show solely the pressurised zone of said front aircraft part.

Thus FIG. 4 depicts the front aircraft part without its front bottom end part 22, so as to show solely the pressurised zone 2 composed of the top pressurised compartment 4 and the under-floor pressurised compartment 6, both separated by the floor 8. In addition, it is possible to see the sealed partition wall 10 forming the front sealed end and anti-bird impact structure for the pressurised zone 2 that it delimits towards the front. In this regard, it should be stated that the wall 10 is fixedly attached to the floor 8 at the join 36 between its bottom portion 32 and its top portion 44. However, this substantially flat-shaped sealed partition wall 10 is in particular fixedly attached over its entire periphery 48 to the aerodynamic fuselage cladding 12, 14, its periphery 48 naturally including the bottom part 40 of the periphery of the aforementioned bottom portion 32.

Figure 5:
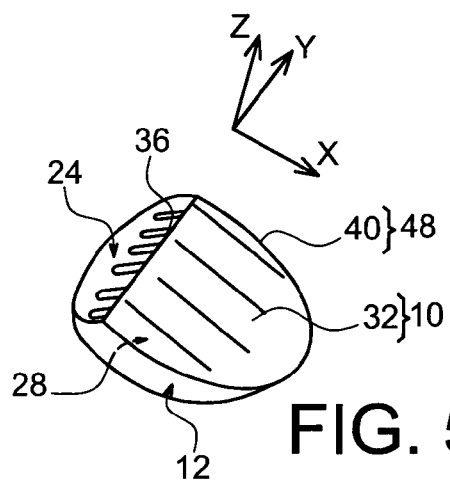
FIG. 5 depicts a perspective view of the non-pressurised landing gear housing zone of the front aircraft part shown in FIGS. 1 to 3, this zone being intended to form a portion of said front bottom end part.
Figure 6:
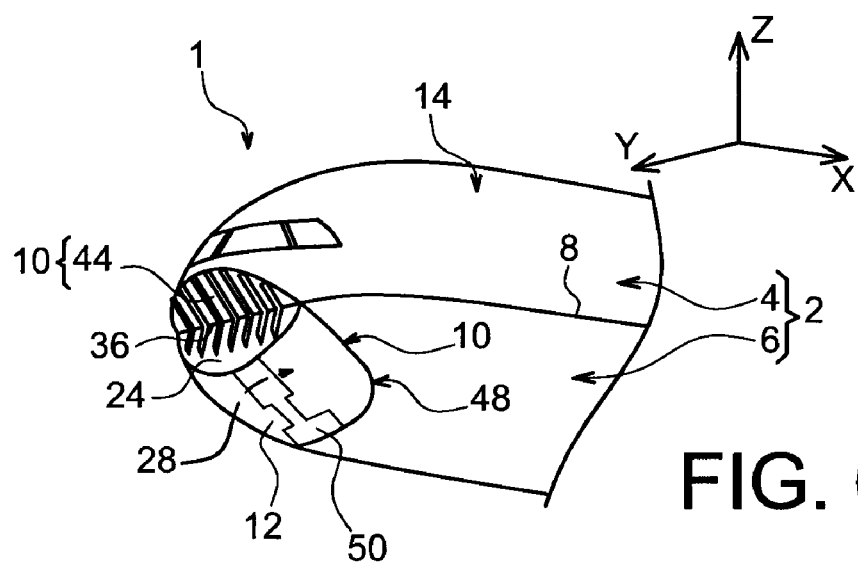
FIG. 6 depicts a perspective view similar to that shown in FIG. 4, in which the non-pressurised landing gear housing zone has been added.

FIG. 5 shows the front landing gear compartment 28 partially delimited by the portion 32 of the sealed partition wall 10, and intended to be attached at the bottom portion of said front bottom end part 22 of the aircraft, as shown in FIG. 6. In the latter figure, it can be seen that the portion of the bottom fuselage 12 forming an integral part of the second set of walls delimiting the landing gear compartment 28 is provided with retractable elements referenced 50, these elements enabling the front landing gear 30 to be deployed being known to persons skilled in the art, and because of this will not be described further.

Figure 7:
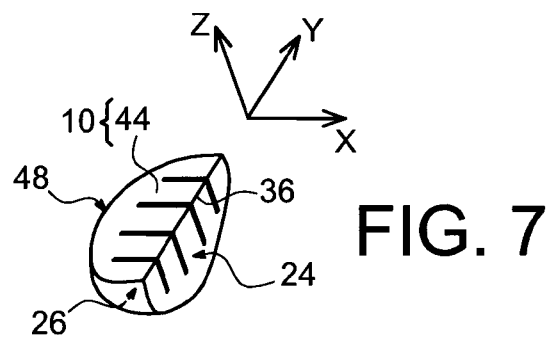
FIG. 7 depicts a perspective view of the non-pressurised radome zone of the front aircraft part shown in FIGS. 1 to 3, this zone being intended to form the other portion of said front bottom end part.
Figure 8:
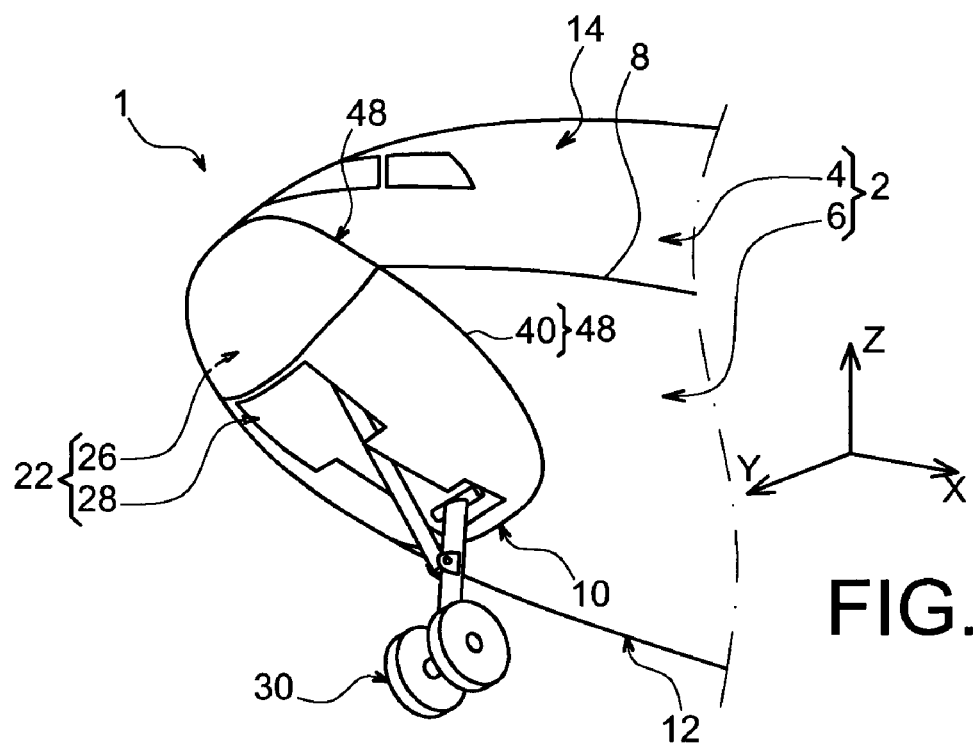
FIG. 8 depicts a perspective view similar to that shown in FIG. 6, in which the non-pressurised radome zone has been added, the front landing gear being shown in its deployed/unfolded state.

FIG. 7 shows the radome zone 26 partially delimited by the intermediate partition 24 and the top portion 44 of the sealed wall 10, this zone 26 being intended to be attached at the top portion of said front bottom end part 22 of the aircraft, as depicted in FIG. 8. It should be noted that, in the latter figure, the front landing gear 30 has been shown in its deployed state, the retractable elements referenced 50 being situated in the open position allowing such a deployed state of the landing gear 30 having been omitted for reasons of clarity.

Figure 9:
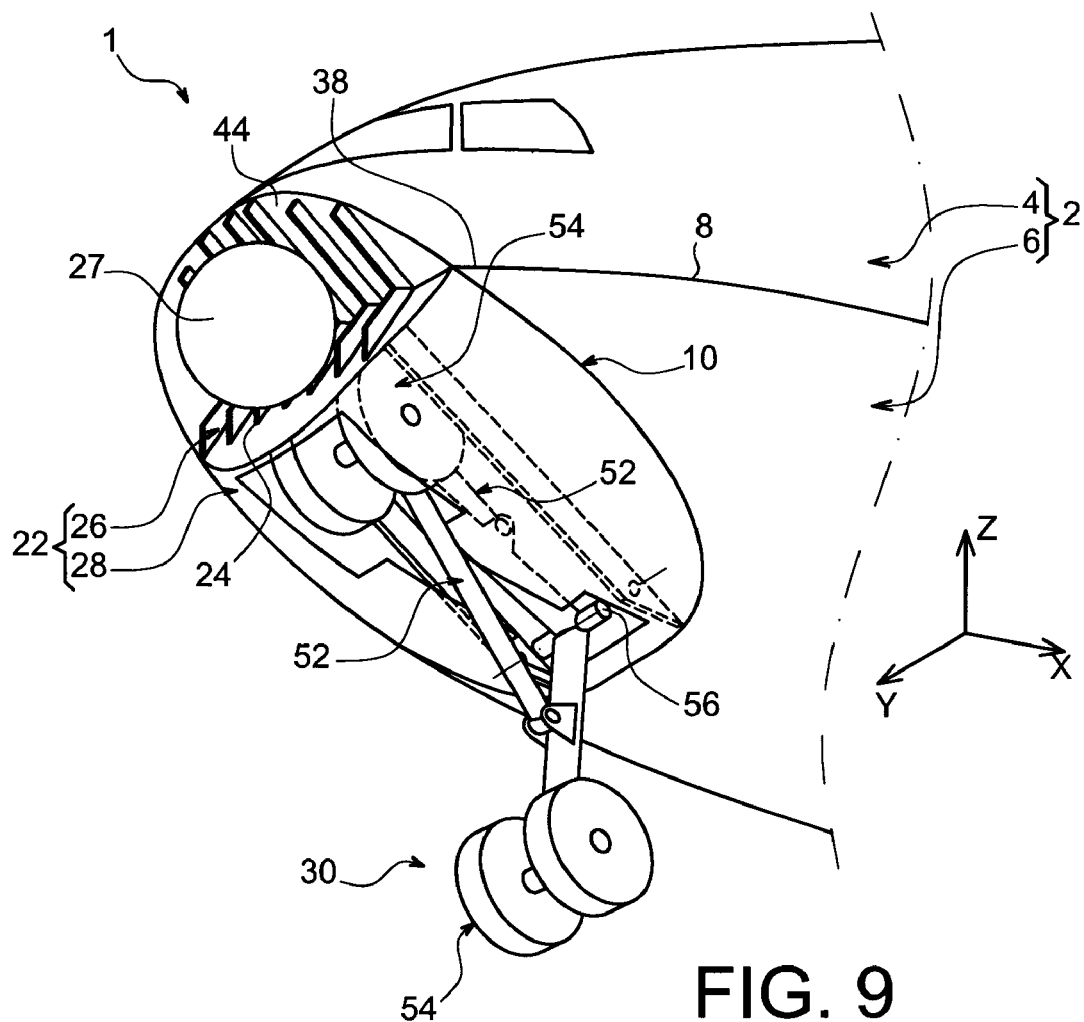
FIG. 9 depicts a partial perspective view of the front aircraft part shown in the previous figures, in which the front landing gear has been detailed.
Figure 10:
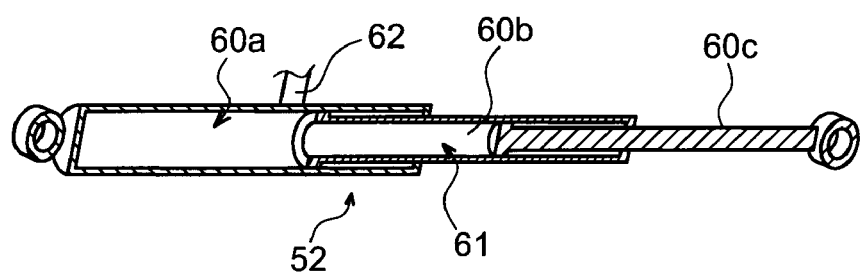
FIG. 10 depicts a schematic perspective view of the deployable extension belonging to the front landing gear shown in FIG. 9.

With regard to the front landing gear 30, FIGS. 9 and 10 show a preferred embodiment in which there is provided a deployable extension 52 carrying a set of tyres 54 at one of its ends and being articulated at the other end on an articulation 56 situated to the rear with respect to a set of tyres 54 when the front landing gear 30 is housed in its retracted state inside the non-pressurised landing gear housing zone 28.

In FIG. 9, the two states of the front landing gear 30 have been shown, namely the retracted state in which the extension 52 is substantially perpendicular to the direction Y and inclined in projection in the plane XZ, for example by an angle of between 10° and 30° with respect to the direction X, and the deployed state in which the extension 52, still perpendicular to the direction Y, is substantially oriented in the direction Z. By way of indication, in the retracted state of the front landing gear 30, the end carrying the set of tyres 54 constitutes the front end and the other end articulated in the direction Y constitutes the rear end.

In this preferred embodiment, one of the particularities is shown in more detail in FIG. 10, namely the design of the deployable extension 52, which is formed by a telescopic mechanism including at least three arms fitted in, and preferably only three arms 60a, 60b, 60c. These three arms forming a jack delimit conjointly a common expansion chamber 61 for the entry of fluid 62, allowing the relative movement of the arms with respect to one another by pressurising the fluid in the chamber 61 occurring following a command to deploy the front landing gear 30. Preferably, the deployable extension 52 is designed firstly to provide the deployment and retraction of the landing gear 30, and secondly to fulfil the function of secure locking of this same landing gear 30 in the deployed position.

Naturally, various modifications can be made by persons skilled in the art to the invention that has just been described, solely by way of non-limitative example. In this regard, as depicted in the figures, the elements 10 and 24 can be equipped with stiffeners on one or other or both of their faces, without departing from the scope of the invention.

The invention claimed is:

1. A front aircraft part, comprising:
a non-pressurised landing gear housing zone to house a front landing gear in a retracted state thereof; and
a pressurised zone adjacent to said non-pressurised landing gear housing zone, wherein
said pressurised zone is delimited by a set of walls among which only a substantially flat-shaped sealed partition wall delimits said non-pressurised landing gear housing zone, said substantially flat-shaped sealed partition wall delimiting, at a top part thereof, a non-pressurised radome zone separated from said non-pressurised landing gear housing zone by an intermediate partition, a front end of said intermediate partition being fixedly attached to an aerodynamic fuselage cladding, and a rear end of said intermediate partition being fixedly attached to said substantially flat-shaped sealed partition wall, and
said substantially flat-shaped sealed partition wall is fixedly attached to a front end of a separation floor between a top pressurised compartment and an under-floor pressured compartment, both of said compartments belonging to said pressurised zone.

2. The front aircraft part according to claim 1, wherein a bottom end of said substantially flat-shaped sealed partition wall is fixedly attached to said aerodynamic fuselage cladding, said sealed partition wall extending forward through said front aircraft part, from a bottom end of said sealed partition wall.

3. The front aircraft part according to claim 1, wherein said non-pressurised landing gear housing zone is delimited by a portion of said substantially flat-shaped sealed partition wall situated under said separation floor.

4. The front aircraft part according to claim 3, wherein a top part of said portion of the substantially flat-shaped sealed partition wall situated under said separation floor is fixedly attached to a front end of the separation floor, and a remaining part of said portion of the substantially flat-shaped sealed partition wall situated under said separation floor is attached fixedly to an aerodynamic fuselage cladding.

5. The front aircraft part according to claim 1, wherein said substantially flat-shaped sealed partition wall is fixedly attached over an entire periphery thereof to an aerodynamic fuselage cladding.

6. The front aircraft part according to claim 1, wherein the rear end of said intermediate partition is fixedly attached to said substantially flat-shaped sealed partition wall, so as to be situated in line with a separation floor.

7. The front aircraft part according to claim 1, wherein said substantially flat-shaped sealed partition wall is produced from composite material.

8. The front aircraft part according to claim 1, further comprising a front landing gear provided with a deployable extension carrying a set of tires at one end and being articulated at an other end on an articulation arranged to a rear of an aircraft with respect to said set of tires when said front landing gear is housed in the retracted state inside said non-pressurised landing gear housing zone.

9. The front aircraft part according to claim 1, wherein said deployable extension is formed by a telescopic mechanism including at least three arms fitted in.

10. The front aircraft part according to claim 1, wherein said substantially flat-shaped sealed partition wall is inclined with respect to the separation floor.

11. The front aircraft part according to claim 10, wherein said substantially flat-shaped sealed partition wall is inclined between 20° and 50° with respect to the separation floor.

12. The front aircraft part according to claim 1, wherein upper and lower ends of said substantially flat-shaped sealed partition wall are fixedly attached to an aerodynamic fuselage cladding such that said substantially flat-shaped sealed partition wall seals said pressurized zone from said non-pressurised landing gear housing zone and said non-pressurised radome zone.

13. A front aircraft part, comprising:
a non-pressurised zone including a landing gear housing zone to house a front landing gear in a retracted state thereof and a radome zone separated from said landing gear housing zone by an intermediate partition; and
a pressurised zone adjacent to and separated from said non-pressurised zone by a substantially flat sealed partition wall, said substantially flat sealed partition wall sealing a front end of the pressurised zone, wherein
said non-pressurised zone is delimited by walls of an aircraft fuselage and said substantially flat sealed partition wall,
upper and lower ends of said substantially flat sealed partition wall are fixedly attached to an aerodynamic fuselage cladding,
a front end of said intermediate partition is fixedly attached to an aerodynamic fuselage cladding,
a rear end of said intermediate partition is fixedly attached to said substantially flat- shaped sealed partition wall, and
said substantially flat sealed partition wall is fixedly attached to a front end of a separation floor separating a top compartment and an under-floor compartment, both of said compartments belonging to said pressurised zone.

14. The front aircraft part according to claim 13, wherein said substantially flat sealed partition wall is inclined with respect to the separation floor.

15. The front aircraft part according to claim 14, wherein said substantially flat-shaped sealed partition wall is inclined between 20° and 50° with respect to the separation floor.

* * * * *